United States Patent Office 3,505,550
Patented Apr. 7, 1970

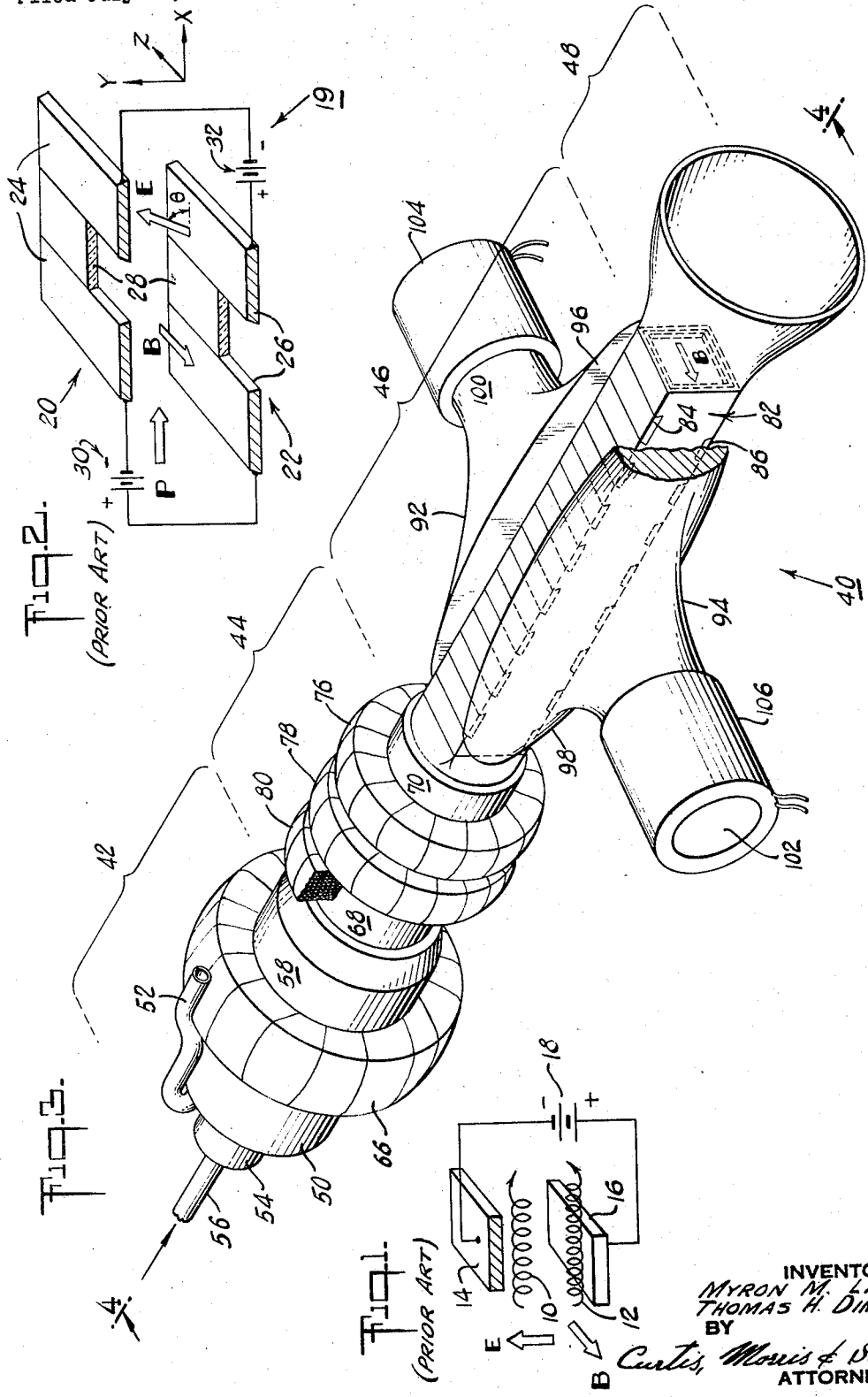

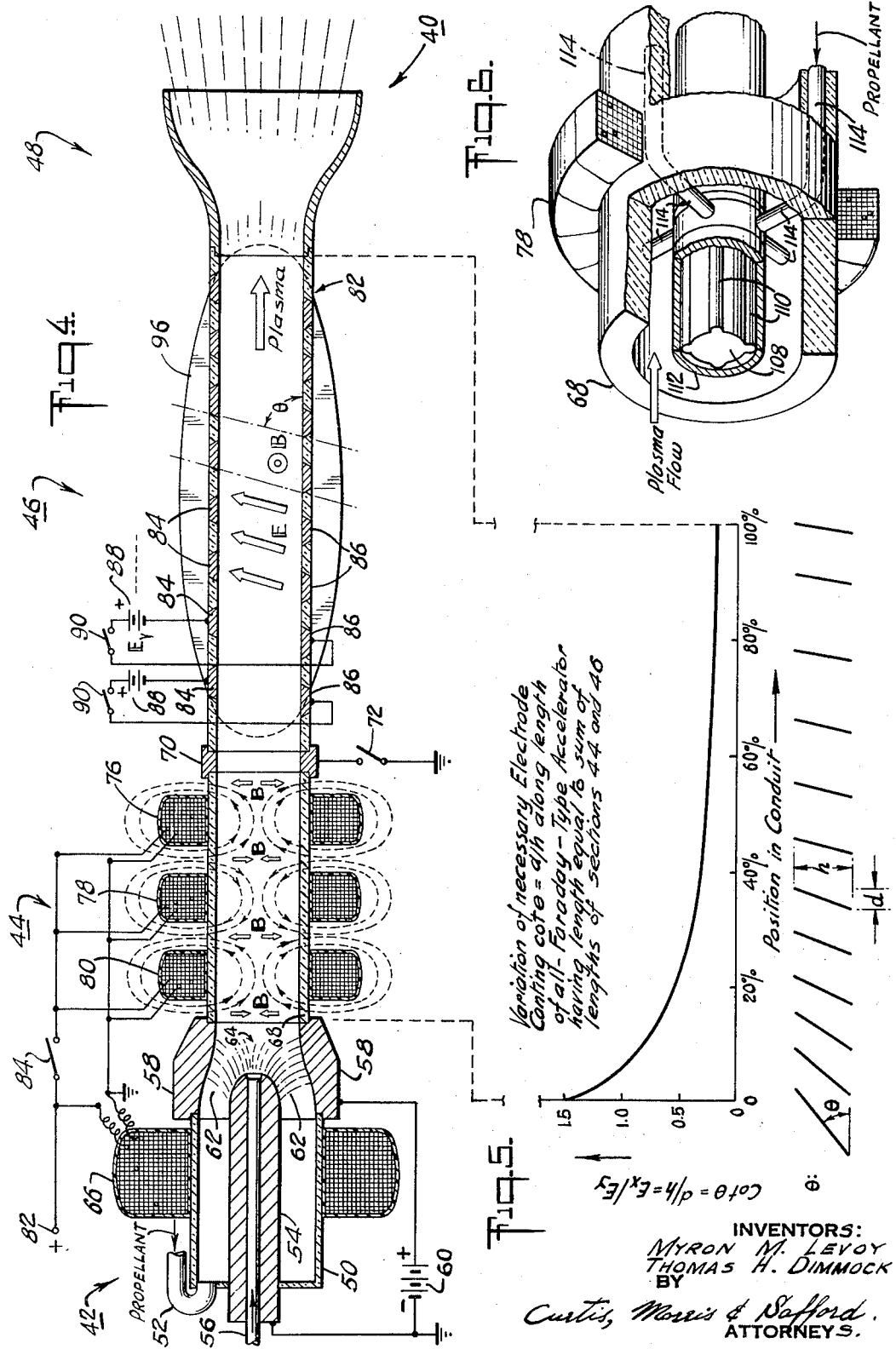

3,505,550
PLASMA ENERGY SYSTEM AND METHOD
Myron M. Levoy, Rockaway, and Thomas H. Dimmock, Morristown, N.J., assignors to Thiokol Chemical Corporation, Bristol, Pa.
Filed July 19, 1966, Ser. No. 566,291
Int. Cl. H05h 1/05
U.S. Cl. 313—63   20 Claims

ABSTRACT OF THE DISCLOSURE

A plasma is generated by heating a seeded propellent gas by means of an electric arc. The plasma then is accelerated by successively applying acceleration forces of the Hall and Faraday types. The plasma then is sent through an expansion nozzle to provide propulsion for a vehicle such as a spacecraft. The Hall and Faraday accelerators are positioned relative to one another so as to take advantage of the best operating parameters of each and give the operation of the overall device maximum efficiency. The Faraday accelerator is of greatly simplified construction because of the use of the Hall accelerator. When the device is used as a propulsion device for spacecraft, the arc, Hall and Faraday accelerators can be used singly or in various combinations to take maximum advantage of pressure changes in the propellent gas supply during an extended space mission.

---

The present invention relates to plasma energy systems and methods, and more particularly to systems and methods using plasmas in spacecraft propulsion.

In spacecraft propulsion systems, two characteristics are quite important; "specific impulse," and "thrust." "Thrust" is the amount of propulsive force developed by a propulsion engine, and "specific impulse" is the ratio of thrust produced to the rate of propellent consumption by the engine. A rocket engine for use in boosting a space vehicle from the earth's surface must provide a thrust greater than the weight of the load to be lifted from the earth's surface. Once the vehicle has been boosted into space, the required rocket thrust is only a very small fraction of that required for lifting the vehicle off the earth's surface. However, the specific impulse values required are higher than at "lift-off."

"Chemical" rocket engines, that is, engines using the combustion of chemical fuels to provide thrust, produce the large amounts of thrust needed to lift such loads from the earth's surface. However, such engines suffer from the disadvantage that they operate with relatively low specific impulse values. Thus, engines having high specific impulse values are desired for use in space flight.

Several different types of propulsion engines having high specific impulse values have been proposed. In one type known as an "electrostatic" engine, thrust is created by electrostatic acceleration of electrons emitted by an electron source in an electric field. This engine gives a very high specific impulse. However, its thrust capabilities are quite limited, with the result that its size and weight become excessive where significant amounts of thrust are required.

"Electric arc" engines have been proposed. Such engines use an electric arc to heat a propulsion gas which then is passed through a standard rocket nozzle to provide thrust. This type of engine gives considerable amounts of thrust, and specific impulse values greater than those of chemical engines. However, its specific impulse values are far below those of the electrostatic engine and are too low for many uses.

Electric plasma engines constitute a third type of electrically-powdered engine. In these engines a propellant gas is partially ionized to form a plasma which is accelerated by magnetic and electric fields and then passed through an expansion nozzle to provide thrust. In theory, such engines are capable of producing a nearly ideal combination of high specific impulse and moderately high thrust values. However, such engines generally have been plagued with problems such as being too large and heavy, and being excessively complicated, both structurally and electrically.

Accordingly, it is an object of the present invention to provide efficient plasma energy systems and methods and small, efficient and simple plasma propulsion engines which produce desirable combinations of specific impulse and thrust.

Further objects and advantages of the present invention will be pointed out in or apparent from the following description and drawings, in which:

FIGURE 1 is a partially-schematic perspective view of a prior art structure used to explain the basic principles of the interaction of ions and electrons with magnetic and electric fields;

FIGURE 2 is a schematic perspective view of a typical prior art structure for plasma acceleration;

FIGURE 3 is a perspective view of a propulsion engine constructed in accordance with the present invention;

FIGURE 4 is a cross-sectional, partially schematic view taken along line 4—4 of FIGURE 3;

FIGURE 5 is a graph showing the variation of certain parameters along the length of a plasma accelerator; and FIGURE 6 is a perspective, partially schematic and partially broken-away view of an alternative structure for use in the device shown in FIGURES 3 and 4.

BASIC PRINCIPLES OF PLASMA INTERACTION WITH MAGNETIC AND ELECTRIC FIELDS

A "plasma" is a body of gas including ions and electrons in substantially equal numbers, and, as the word is used herein, includes bodies of gas having substantial numbers of neutral gas atoms. The plasma is electrically conductive, but has an overall neutral electrical charge.

When ions and electrons such as those in a plasma are placed in a magnetic field, they tend to move in a circular path. FIGURE 1 shows schematically the path 10 believed to be taken by an ion and the path 12 believed to be taken by an electron when placed in crossed electric and magnetic fields. It is assumed that the particles do not collide with other particles. The direction of the magnetic flux is indicated by the arrow B, and the direction of the electric field by the arrow E, a convention which will be used throughout the following description. The electric field may be developed, for example, by a battery 18 connected between a cathode 14 and an anode 16.

If the electrical field were not present, both the ion and the electron would tend to rotate in a circular path whose plane would be perpendicular to the direction of magnetic flux. However, the addition of the electric field, it is believed, causes both particles to move progressively towards the right in FIGURE 1 in the looped paths 10 and 12. The reason for this is believed to be that as the ion is moving toward the cathode 14 it is accelerated by electrostatic attraction to the oppositely-charged cathode. Therefore, its radius of circular motion increases. However, the ion is decelerated when moving towards the anode 16, thus reducing its radius of motion. These alternating small and large radii of rotation cause progressive forward motion and, hence, acceleration of both the ion and the electron towards the right. In most practical structures, the radius of gyration of the electrons is relatively small, but that of the ions is very large in comparison with the distances between opposite electrodes. Further details of the interaction of ions and electrons with crossed fields are explained in prior art such as "Plasma Physics and Magnetohydrodynamics In Space Exploration," N.A.S.A., SP25, December 1962, pp. 9–31 and 57–87 (Office of Scientific and Technical Information, Washington, D.C.).

FIGURE 2 is a schematic representation of what is termed herein as a "Faraday" crossed-field plasma accelerator 19. The accelerator 19 has two opposite electrode arrays 20 and 22, each including a plurality of individual electrodes 24 and 26, respectively. Strips 28 of insulation are positioned between adjacent electrodes. A separate potential source 30 or 32 is connected between opposed electrodes to create a separate electrical field between the electrodes of each pair. A plasma flows between the electrode arrays in the direction indicated by the arrow P. A magnetic field B is provided as in the FIGURE 1 arrangement.

A major difference between the Faraday device 19 and the idealized device shown in FIG. 1 is that the plasma flowing in FIGURE 2 is more dense; that is, it has considerable concentrations of ions, electrons and neutral atoms so that they frequently collide with one another, whereas there was assumed to be no such collisions in the FIGURE 1 structure. One result of the presence of such a dense plasma in the FIGURE 2 device is that electrons in the plasma are not believed to follow the looped path shown in FIGURE 1. One reason for this seems to be that each electron usually collides with a neutral particle or ion shortly after it starts a loop or, at most after several loops. The collision temporarily reduces or nullifies the electron's looping or gyrating velocity. With little or no net velocity, the electron momentarily behaves as if only an electric field (but no magnetic field) were present and moves toward the anode 26. Once such movement begins, the magnetic field again acts on the electron and causes it to gyrate. Then the electron again collides with another particle, and its movement cycle is repeated over and over again. The ions and neutral atoms are believed to be accelerated by the generally forwardly-directed impulses caused by the above-described collisions with electrons.

As is known in the art, the average number of loops traversed by an electron prior to a collision can be controlled to a certain degree. Higher gas (plasma) pressures increase the chance of collisions, while higher mag-field strengths lead to more gyrations per collision. A somewhat arbitrary standard has been set; if, on the average, an electron traverses no more than about two loops before a collision, the accelerator is said to be operating in the "Faraday" mode. If the electron traverses about ten or more loops before a collision, it is said to be operating in the "Hall" mode. Between these somewhat arbitrary limits, a combination of "Hall" and "Faraday" modes of operation prevails.

The electrode set in the Faraday device 19 are "canted" with respect to one another; that is, the upper electrode of each electrode pair is not located directly above the lower electrode, but is offset somewhat downstream. Thus, each electrode pair develops a field aligned at an angle $\theta$ with horizontal. The purpose of electrode canting is described in the prior art as being to offset the induced reverse current which otherwise would flow in the plasma and tend to partly deflect the plasma particles. By canting the electric field at an angle $\theta$, there is provided an X-directed electric field component which opposes and inhibits the reverse plasma current. The electrodes 24 and 26 are made in segments insulated from one another so as not to build up a large inter-electrode voltage which could cause voltage breakdown and arcing, and other undesirable effects.

THE PROPULSION ENGINE

FIGURES 3 and 4 show a propulsion engine 40 utilizing the preferred embodiment of the present invention. Briefly, the engine 40 comprises an electric arc section 42, a "Hall" accelerator section 44, a "Faraday" accelerator section 46, and an expansion nozzle section 48. A propellent gas is introduced into the arc section 42, is heated and ionized in the arc section, and is accelerated to a speed of around Mach 1 by a converging conduit at the intersection between the arc section 42 and the Hall section 44. Then the plasma is further accelerated in the Hall section 44, the Faraday section 46, and the expansion nozzle 48 to produce a high-velocity propulsion jet which may be given unique combinations of high thrust and specific impulse values.

FIGURE 4 shows many of the details of the construction of the engine 40. Referring now to FIGURE 4, the arc section 42 of the engine includes a chamber 50 made of an insulating material, preferably boron nitride or another known ceramic material. An inlet tube 52 is provided by means of which a propellant such as hydrogen gas can be introduced into the chamber 50. A hollow metal electrode 54 is mounted in the rear wall of chamber 50, and has a tube 56 passing longitudinally through it. An alkali metal "seed" material 64 is fed into the engine through the tube 56. The seed metal preferably is potassium, but may be one of a number of other well known seed materials. It is introduced into the midst of an arc 62 so that it is vaporized and ionized by the high heat generated by the arc.

A ring-shaped electrode 58 is secured to the forward end of the chamber 50. The internal surface of electrode 58 forms a somewhat converging gas passageway for accelerating the propellant gas to sonic velocity. A direct current electrical power supply 60 is connected between electrodes 54 and 58. The energy supplied by power supply 60 is sufficient to create the arc 62 between electrode 58 and the end of electrode 54. This arc has a very high temperature (around 2,000 Kelvin) and heats the propellant and potassium 64 emerging from the tube 56 so as to ionize the potassium which, when mixed with the propellant, forms a plasma which is electrically conductive.

A solenoid 66 extends around the forward end of the chamber 50. Solenoid 66 produces longitudinal flux lines in the chamber 50 near the arc 62 and causes the arc to rotate. This rotation of the arc prevents the arc from developing concentrated areas of high temperature (hot spots) and thus tends to prevent destruction of the electrode 58.

The accelerated and heated plasma emerges from the arc section 42 and enters the Hall section 44. The Hall section 44 includes a generally cylindrical chamber or tube 68 made of insulating material, preferably boron nitride or other ceramic material. A ring-shaped electrode 70 is secured to the end of tube 68. The electrode 70 is connected to the negative terminal of the power supply 60 through a switch 72 and through ground. Three solenoids 76, 78 and 80 are wrapped around the outside of tube 68 at spaced intervals. All four solenoids 66, 76, 78 and 80 are energized from a common power supply terminal 82. A switch 84 makes it possible to de-energize the Hall section solenoids 76, 78 and 80 respectively from the arc section solenoid 66.

Each of the solenoids 76, 78 and 80 produces flux having lines of force whose directions are indicated approximately by the dashed lines in FIGURE 4. The flux created in the chamber 68 has both radial and longitudinal components. However, by using several closely spaced solenoids as shown in FIGURE 4, the flux in chamber 68 is predominately radially-directed as is indicated by the heavy radially-directed arrows B in FIGURE 4. The application of a voltage as shown between the electrode 58 and the electrode 70 at the opposite end of chamber 68 creates a longitudinally-directed electric field. Thus, throughout the length of the tube 68, there exists (except along the central axis) an electric field extending in a direction essentially perpendicular to the direction of the magnetic field. Within this Hall section, the electron drift or loop progression takes place in the azimuthal direction, that is, a circular current in induced around the longitudinal axis of the Hall section. In this case, there is no electrode canting or other opposed electric field impressed to nullify this Hall current. This induced Hall current is also perpendicular to the magnetic field, and it is believed, it is this Hall current plus the magnetic field which provides the driving force that accelerates the gas in the Hall section.

An advantageous feature of the arrangement of solenoids 76, 78 and 80 is that the direction of flux in coil 78 is reverse from that of coil 76 and 80 so that the longitudinal flux tends to be greatly reduced by the opposing flux produced by the solenoids 76, 78 and 80. A greater number of solenoids may be required in actual practice than the three shown in FIGURE 4. In such cases, neighboring solenoids would have reversed fluxes successively.

The principles of operation of an accelerator similar to the accelerator 44 have been described in greater detail in the prior art. For example, see pages 19–23 of the NASA publication identified above.

When the accelerated gas leaves the Hall section 44, it enters the Faraday section 46. The Faraday accelerator 46 includes an elongated square tube 82 (see FIGURE 3) made of insulating material, preferably ceramic material, with a plurality of identical upper electrodes 84 fitted into slots spaced equally from one another along the length of the tube 82, and similar bottom electrodes 86 inserted and similarly spaced from one another in the bottom surface of the tube 82. The top and bottom electrodes 84 and 86 are arranged in opposite pairs which are "canted" with respect to one another in the manner shown in FIGURE 2. That is, a line drawn through the center of each electrode in a pair forms an angle $\theta$ with the longitudinal wall of the accelerator section 46. A separate power supply 88 is connected between the electrodes in each pair through a switch 90. Only two such power supply arrangements are shown in FIGURE 4 for the sake of clarity in the drawings.

Referring again to FIGURE 3, two iron pole-pieces 92 and 94 are positioned on opposite sides of the tube 82. Each pole-piece is generally T-shaped with an elongated, generally elliptically-shaped pole face portion 96 and 98, respectively. Other pole-piece shapes can be provided within the skill of the art. Each pole face portion has a flat forward surface which abuts against a flat side of the tube 82. Each pole member 92 and 94 has a stem portion 100 or 102 around which a solenoid 104 or 106 is wound. The solenoids 104 and 106 produce flux of opposite polarity so as to create substantially horizontal lines of flux between the pole faces 96 and 98. As shown in FIGURE 4, this flux extends out from the surface of the drawing; that is, from pole face 96 to pole face 98. As was indicated above, the Faraday accelerator tube 82 is square in cross section. Accordingly, at its upstream end it is shaped to form a cylindrical collar to fit into the ring-shaped electrode 70. Similarly, the expansion nozzle section 48 is shaped so as to change from a circular cross section to a square cross section at its inlet so as to fit tightly onto the downstream end of the square tube 82.

The Faraday accelerator section 46 receives plasma from the Hall section 44 and further accelerates it substantially in the manner described above in connection with FIGURE 2. Then, the expansion nozzle section 48 receives the high-speed supersonic gas stream and further accelerates it to higher Mach numbers.

Applicants have recognized that Hall type and Faraday type plasma accelerators operate at peak efficiency with substantially different operational parameters. For example, Hall-type devices usually require greater magnetic flux densities than Faraday devices. Conversely, it is believed that the Faraday device is more effective when operating up high-density plasmas than upon low density plasmas, whereas the Hall device is believed to operate best upon low-density plasmas.

In accordance with the present invention, applicants have realized that by utilizing both types of devices in a single engine the most efficient type of accelerator can be used at the proper place along the length of the accelerator duct so as to give maximum overall propulsion efficiency. For example, in some engine configurations a Faraday accelerator might be used at the upstream end and a Hall accelerator at the downstream end where the plasma pressure and, hence, density is lower and better suited to a Hall type of operation. Such a propulsion engine, as well as the present embodiment of FIGURES 3 and 4, is ideally suited to produce variable amounts of thrust and specific impulse, a feature which is highly desirable on extended trips through space. For example, during a trip from Earth to Mars, a maximum amount of thrust will be needed when leaving the Earth's gravitational field. Hence, for such an operation, the electrical energization of the Hall and Faraday sections can be removed and the engine 40 operates as a pure arcjet engine giving high thrust but with a relatively low specific impulse.

During later parts of the journey, only moderate amounts of thrust are required, but the specific impulse must be relatively high in order to conserve propellant. During this phase of the journey, either the Hall section or the Faraday section or both can be operated to give relatively high specific impulse values and corresponding propellant savings. If the propellant gas pressure is relatively high (e.g., 2 to 5 atmospheres) then it probably will be best to use the Faraday section alone. If the propellant gas pressures are intermediate (e.g., 0.1 to 2.0 atmospheres) probably both the Hall and Faraday sections should be used to give the most efficient results. Finally, when the propellant gas pressure is low, the Hall section can be used alone with the Faraday section inoperative.

In the usual plasma engine using only a Faraday type accelerator, the electrical field is "shaped" to give a certain desired characteristic to the acceleration produced by the device. That is, the voltage between each pair of electrodes is changed along the length of the accelerator conduit so as to give a desired characteristic to the acceleration. For example, accelerators have been proposed in which the field is shaped so as to give a constant static plasma temperature along the duct. Others have been proposed giving maximum acceleration increase, and still others giving a maximum rate of Mach number increase, the latter being termed "maximum Mach number" ducts.

The engine 40 shown in FIGURE 4 has field shaping in the Faraday section 46 such that it is a "maximum Mach number" device. This is believed to be a desirable shaping technique for obtaining reasonably high specific impulses, without excessive gas temperature increases. In order to obtain the desired shaping, the voltage applied between adjacent pairs of electrodes increases approximately linearly (in steps, of course) with the length of the duct, starting from the upstream end. In one specific example of a Faraday duct using hydrogen as a propellant, having a magnetic field strength of 20,000 gauss, a gas pressure of one atmosphere and producing a specific impulse of 4,000 seconds, the applied voltage was set so as to increase at a rate of approximately 125 volts per centimeter of duct length in order to produce maximum Mach number acceleration.

Applicants have found that the required electric field shaping in an all-Faraday accelerator causes serious structural design problems and deleteriously affects operating efficiency. The electrode canting must be varied in a very nonlinear fashion if reasonably high specific impulse values are to be achieved. FIGURE 5 shows the variation of the canting (cotangent of $\theta$) for the electrodes as required in a maximum Mach number all-Faraday duct having a length equal to the combined length of sections 44 and 46 of the engine 40.

As was explained above, electrode canting is required in order to produce a forwardly-directed component of electrical field to offset the backwardly-directed field developed by the electron drift or Hall current. The canting angle $\theta$ of each pair of electrodes may be expressed by the following equation:

$$\cot \theta = \frac{d}{h} = \frac{E_x}{E_y} = \frac{\omega\tau(E_y - CVxB)}{E_y}$$

In which:
$\theta$ is the angle shown in FIGURE 2, and $d$ and $h$ are the horizontal and vertical sides of a triangle formed with its hypotenuse forming the angle $\theta$ as shown;
$E_y$ is the voltage applied between electrodes;
$E_x$ is the upstream or back-directed induced voltage to be compensated for;
$\omega\tau$ is the average number of revolutions through which an electron gyrates before colliding with another particle in the plasma;
V is the gas velocity through the accelerator;
B is the magnetic field strength; and
C is a constant whose value depends upon the units used to express B and V.

As explained above, at positions progressively further down the duct, $E_y$ increases due to field shaping. Since the gas is accelerating, its density progressively decreases, and the electron revolutions per collision progressively increases at positions progressively further downstream in the duct. However, as the gas accelerates, its velocity increases and the quantity ($V x B$) increases at distances progressively further down the duct. The latter quantity increases at such a high rate, in fact, that the quantity ($E_y - CVxB$) decreases at progressively further distances down the duct. In fact, the latter quantity apparently decreases faster than $\omega\tau$ increases, with the net result that the required canting ($\cot \theta$) decreases quite nonlinearly in the first 20% of the duct length, but is approximately linear for the rest of the length. FIGURE 5 shows the nonlinearity of the canting variation. The slanted lines below the graph each represent the canting line required at that position in the duct.

As was noted above, the canting varies sharply within the first 20% of the duct length in the Faraday section, but varies relatively little in the last 80% of the duct length. Applicants have taken advantage of this fact by placing the Faraday accelerator 46 in the last part of the duct of the engine 40, and placing the Hall accelerator 45 in the first part of the duct. With this arrangement a constant electrode canting can be used throughout the length of the Faraday section 46 without any significant loss of efficiency. This greatly simplifies the construction of the engine since all of the electrodes 84 and 86 can be the same size and can be symmetrically positioned. Moreover, the required canting has been found to stay relatively constant over a wide range of operating parameters. That is, gas pressures and temperatures can vary over a considerable range without requiring a change in the canting in order to retain maximum efficiency. Thus, applicants have provided a Faraday accelerator section whose efficiency is near maximum throughout wide variations of operating parameters.

It should be understood that in other types of ducts with other types of field shaping, the canting may change differently and dictate different locations of the Hall and Faraday sections. If, for example, the required canting is relatively small at the beginning and large at the end, it would be preferable to place the Hall accelerator at the downstream end of the engine and the Faraday section at the upstream end.

It should be understood that in an actual engine additional structure will be provided to secure the components of the engine 40 together. However, such structural details are not shown because they do not form a part of the invention and because their provision is well within the skill of the art. It also should be understood that it will be quite desirable and possibly necessary to provide cooling for the walls of the plasma engine 40 because of the high temperatures developed in the plasma. If desired, the propellant gas can be circulated along the outside surface of the engine 40 and around the hot components of the engine to cool them before being fed through the inlet tube 52. Inlet tube 52 is shown with its opening facing forward so as to more easily receive such recirculation gas.

FIGURE 6 shows an alternative form of construction for the Hall accelerator portion 44 of the plasma engine 40, and shows a portion of a suitable and advantageous gas recirculation cooling system. Only one solenoid 78 is provided in the FIGURE 6 structure in order to simplify the drawing. Mounted along the longitudinal axis of the tube 68 is an iron core member 108. Core member 108 is provided in order to concentrate the longitudinally directed flux lines from the coils 76, 78 and 80 and thus provide substantially nothing but radial flux lines in the gas flow passageway between the core member 108 and the inner wall of the chamber 68. Core 108 is mounted in a pipe 112 preferably of material of high magnetic permeability which is open at its upstream end. Pipe 112 is supported in the housing 68 by means of four relatively slender radial tubes 114. Similar groups of such support tubes may be provided at spaced intervals along the duct. Each of the tubes 114 extends into the ceramic wall of housing 68 and downstream through the hollow passageways in the ceramic material. A cool propellant gas or liquid is fed through the tubes 114 and into the pipe 112 surrounding the core 108. The gas flows towards the arc chamber where it is mixed with the hot onrushing gases and is then carried downstream as part of the plasma. However, as it flows through the walls of the chamber 68 and through the pipe 112 it cools the chamber walls and the core 108 and pipe 112 so as to prevent them from becoming over-heated.

The number of electrode pairs used in the Faraday section 46 of the engine 40 and of the solenoids in the Hall section 44 may be selected at any value desired to give a selected plasma Mach number or specific impulse. The rate of divergence and shaping of the expansion nozzle section 48 similarly may be determined by well known principles to give a desired Mach number of plasma flow.

The above description of the invention is intended to be illustrative and not limiting. Various changes or modifications in the embodiments described may occur to those skilled in the art and these can be made without departing from the spirit or scope of the invention as set forth in the claims.

We claim:
1. Plasma energy conversion means comprising, in combination, a plasma flow conduit, means for introducing a gaseous plasma into said conduit, first magnetic means for developing a magnetic field having flux lines extending transversely into said conduit at a first position along the length of said conduit, a first pair of spaced apart electrodes in said conduit at said first position, said electrodes being spaced apart longitudinally in said conduit with said flux lines from said first magnetic means extending between said electrodes in a direction transverse to the direction of alignment of said electrodes with respect to one another, second magnetic means for developing a magnetic field having flux lines extending transversely into said conduit at a second position along the length of said conduit, said second position being spaced from said first position, and a second pair of spaced apart electrodes positioned in said conduit with the magnetic flux lines developed by said second magnetic means extending transversely to the direction of alignment of said electrodes of said second pair with respect to one another, and means for creating an electrical potential between the electrodes of each of said electrode pairs.

2. Apparatus as in claim 1 in which said first position is upstream from said second position.

3. Apparatus as in claim 1 including an odd number of solenoids wrapped around said conduit at longitudinally spaced apart locations adjacent said first position, with successive ones of said solenoids producing flux of opposite polarity.

4. Apparatus as in claim 2 including a plurality of said second pairs of electrodes distributed at spaced intervals along said conduit with the magnetic flux from said second magnetic means extending into said conduit between the electrodes of each of said second pairs, said potential creating means including means for applying different voltages to different ones of said second pairs.

5. Apparatus as in claim 2 in which said first magnetic means includes at least one solenoid wrapped around said conduit at said first position.

6. Apparatus as in claim 4 in which said different voltages generally increase from one to the next downstream one of said second pairs.

7. A method of accelerating a gaseous plasma to relatively high velocities, said method comprising the steps of successively applying to said plasma accelerating forces predominantly of the Hall type and predominantly of the Faraday type.

8. A method as in claim 7 in which said Hall forces are applied before said Faraday forces are applied.

9. A method as in claim 7 including generating said plasma by passing a gas through an electric arc and introducing a vaporizable conductive material into said arc.

10. A method as in claim 9 including passing a relatively cool gas into said plasma after emerging from said arc.

11. A propulsion device comprising, in combination, plasma generation means, means for introducing a propulsion gas into said plasma generation means, an acceleration conduit coupled to receive said plasma from said generation means, a first plasma accelerator comprising means for developing first crossed magnetic and electric fields both passing transversely into said conduit at a first position, a second plasma accelerator comprising means for developing second crossed magnetic and electric fields with said second magnetic field passing transversely into said conduit at a second position spaced from said first position, one of said first and second electric fields extending primarily longitudinally in said conduit.

12. Apparatus as in claim 11 in which said first position is upstream from said second position.

13. Apparatus as in claim 11 including a diverging expansion nozzle connected to the downstream end of said conduit.

14. Plasma energy conversion means comprising, in combination, a plasma flow conduit, means for introducing a gaseous plasma into said conduit, first magnetic means for developing a magnetic field having flux lines extending transversely into said conduit in a first section of said conduit, a plurality of pairs of spaced-apart, canted electrodes in said first conduit section, the electrodes of each pair being located opposite one another on opposite sides of said conduit, means for applying voltages between the electrodes of each of said electrode pairs, said flux lines from said first magnetic means extending between said electrodes in a direction transverse to the direction of alignment of said electrodes with respect to one another, second magnetic means for developing a second magnetic field having flux lines extending transversely into a second section of said conduit, said second section being connected to said first section, two longitudinally spaced-apart electrodes positioned in said second section of said conduit for creating a longitudinally-directed electric field, the magnetic flux lines developed by said second magnetic means extending transversely to said longitudinally-directed field, said second section of said conduit extending over a distance in which the degree of electrode canting required therein would be substantially greater than that required in said first section if the electrodes in both of said conduit sections comprised canted electrode pairs.

15. Apparatus as in claim 14 in which the voltages applied between the electrodes of the different electrode pairs in said first section are unequal, the degree of canting of said electrodes in said first section being substantially constant.

16. Apparatus as in claim 15 in which the electric field between the electrodes in said first section has substantially maximum Mach number shaping, with the electrical field strength increasing between electrodes located at increasingly greater distances downstream in said conduit.

17. Apparatus as in claim 14 including an arc-type plasma generator connected to the inlet of said second section, and a diverging nozzle section at the outlet of said first section.

18. A spacecraft propulsion method, said method comprising supplying a pressurized propellant gas to an arc-type plasma generator at a pressure which decreases as the gas is utilized, energizing said plasma generator to generate a plasma, passing the resulting plasma through propulsion nozzle means having both Hall-type and Faraday-type plasma accelerators, energizing only the Faraday-type accelerator when the value of the propellant gas pressure is relatively high, and energizing only the Hall-type accelerator when the value of said propellant gas pressure is relatively low.

19. A method as in claim 18 including energizing both of said accelerators simultaneously when said propellant gas pressure is intermediate said relatively high value and said relatively low value.

20. A method as in claim 18 including the step of energizing only said arc-type plasma generator during escape of said spacecraft from the earth's gravitational field.

References Cited

UNITED STATES PATENTS

| 3,171,060 | 2/1965 | Wood et al. | 313—63 X |
| 3,174,278 | 3/1965 | Barger et al. | 313—63 X |
| 3,183,403 | 5/1965 | Hurwitz et al. | 313—231 X |
| 3,241,490 | 3/1966 | Ricateau et al. | |
| 3,243,954 | 4/1966 | Cann | 313—231 X |
| 3,355,605 | 11/1967 | Okress | 301—11 |

JAMES W. LAWRENCE, Primary Examiner

R. F. HOSSFELD, Assistant Examiner

U.S. Cl. X.R.

60—202; 310—11; 313—231; 315—111